(12) United States Patent
Kim

(10) Patent No.: US 6,522,307 B2
(45) Date of Patent: Feb. 18, 2003

(54) ANTENNA SHARING APPARATUS OF BASE STATION IN W-CDMA SYSTEM

(75) Inventor: Tae Wook Kim, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/902,663

(22) Filed: Jul. 12, 2001

(65) Prior Publication Data

US 2002/0009982 A1 Jan. 24, 2002

(30) Foreign Application Priority Data

Jul. 14, 2000 (KR) ............................................. 00-40495
Nov. 25, 2000 (KR) ............................................. 00-70606

(51) Int. Cl.[7] .................................................. H04J 3/18
(52) U.S. Cl. ...................................... 343/850; 370/342
(58) Field of Search .......................... 343/850; 370/342, 370/479, 335; 455/11.1, 422, 101; 375/206, 349

(56) References Cited

U.S. PATENT DOCUMENTS 5,061,937 A * 10/1991 Ozeki et al. ................ 342/372
5,289,499 A * 2/1994 Weerackody .................. 375/1
5,781,541 A * 7/1998 Schneider .................. 370/335
5,790,588 A * 8/1998 Fukawa et al. .............. 375/200
5,832,389 A * 11/1998 Dent .......................... 455/562
5,867,763 A * 2/1999 Dean et al. .................. 455/5.1
5,926,503 A * 7/1999 Kelton et al. ............... 375/206
6,052,366 A * 4/2000 Suzuki ........................ 370/342
6,088,570 A * 7/2000 Komara et al. ............ 455/11.1

* cited by examiner

Primary Examiner—Don Wong
Assistant Examiner—James Clinger
(74) Attorney, Agent, or Firm—Fleshner & Kim, LLP

(57) ABSTRACT

A W-CDMA system having a plurality of antenna sharing apparatuses each having an LNA (Low Noise Amplifier) for receiving a first reception signal for a space diversity from a transmission-reception antenna and separately outputting it to a first and a second paths and a band-pass filter filtering a second reception signal for the space diversity, wherein one antenna sharing apparatus connects a second path of each antenna sharing apparatus to an input terminal of a band-pass filter of a different antenna sharing apparatus in case of increasing a frequency allocation (FA). In case of using a plurality of radio frequency band (FA) in the WLL-CDMA system, the antenna can be shared by a simple cable connection, so that the number of antenna and components required for additionally installing the antenna can be reduced.

13 Claims, 4 Drawing Sheets

the number of antennas.

ANTENNA SHARING APPARATUS OF BASE STATION IN W-CDMA SYSTEM

BACKGROUND OF THE INVENTION

1. Field of the Invention

The present invention relates to a W-CDMA (Wideband-CDMA) system, and more particularly, to an antenna sharing apparatus of a base station for sharing an existing antenna in case of increasing a frequency allocation.

2. Description of the Background Art

In general, a W-CDMA system provides a voice and a data communication service. A channel signal transmitted from a terminal is transmitted through various radio paths to a base station.

At this time, an interruption occurs between signals having different receiving paths among signals transmitted from the base station, causing a fading phenomenon that an attenuation rate varies as time elapses, which triggers an error of a reception signal in the base station.

Therefore, in order to minimize such a fading phenomenon, the base station synthesizes an output of an antenna by a space diversity method, that is, by using two reception antennas.

If a resource at a frequency band for service is not sufficient, the frequency bands (FA), a plurality of communication channels, are positioned mutually adjacent without a guard band.

Accordingly, unlike a PCS system having the guard band, the WLL-CDMA system separately installs a transmission-reception antenna by frequency bands and operates it.

FIG. 1 is a drawing illustrating a related art antenna sharing apparatus of a base station using a single frequency band.

As shown in FIG. 1, a conventional antenna sharing apparatus of a base station includes a transmission-reception antenna 10, a receiving dedicated antenna 12 and a duplexer 20.

The antenna 10 is used as a transmission antenna, while the antennas 10 and 12 are used as the first and the second reception antennas for a space diversity.

Since the antenna 10 can be used both for transmission and reception, the duplexer 20 separates a transmission signal (Tx1) and a reception signal (Rx1) by using a filtering function. That is, the duplexer 20 outputs a transmission signal (Tx1) provided from the base station to the antenna 10, and outputs the reception signal (Rx1) inputted through the antenna 10 to the base station.

Accordingly, the base station synthesizes the reception signals (Rx1 and Rx1') inputted through the antennas 10 and 12 to prevent the fading phenomenon.

Generally, the WLL-CDMA system is allocated a specific frequency and provides a radio communication service to subscribers.

At this time, the radio frequency allocation is made in consideration of the number of expected subscribers, and the radio frequency is additionally allocated according to change in the number of the subscribers.

Accordingly, in case that a frequency allocation is additionally made in line with an increase in the number of the subscribers, the antenna needs to be additionally installed corresponding to the added frequency allocation.

For example, if a single frequency band (1 FA) is used, as shown in FIG. 1, two antennas are required. If two frequency bands (2 FA) are used, as shown in FIG. 2, two more antennas need to be installed.

In this manner, whenever the FA is increased, two antennas are additionally increased, causing a problem that an antenna installation cost is additionally incurred due to the increasing number of antennas.

In addition, in the conventional antenna sharing apparatus, between the duplexer 20 and the antennas 10 and 12 is a wired section to be connected by a cable directly by a person.

Consequently, in consideration of the fact that the WLL-CDMA system is installed and operated in an area where a wired telephone network is hardly adopted, additional installation of the antenna in line with the increase in the frequency allocation is practically difficult.

The above references are incorporated by reference herein where appropriate for appropriate teachings of additional or alternative details, features and/or technical background.

SUMMARY OF THE INVENTION

Therefore, an object of the present invention is to provide an antenna sharing apparatus of a base station in a W-CDMA system that is capable of reducing an expense by minimizing the number of antenna in case of additional frequency allocation.

To achieve at least the above objects in whole or in parts, there is provided a W-CDMA system including a plurality of antenna sharing apparatuses of a base station having a LAN for receiving a first reception signal for a space diversity from a transmission-reception antenna, low-noise amplifying it and separately outputting it to a first and a second paths, and a band-pass filter for filtering a second reception signal for a space diversity, wherein the second path of each antenna sharing apparatus is connected to an input terminal of the band-pass filter of a different antenna sharing apparatus.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Figure 1:
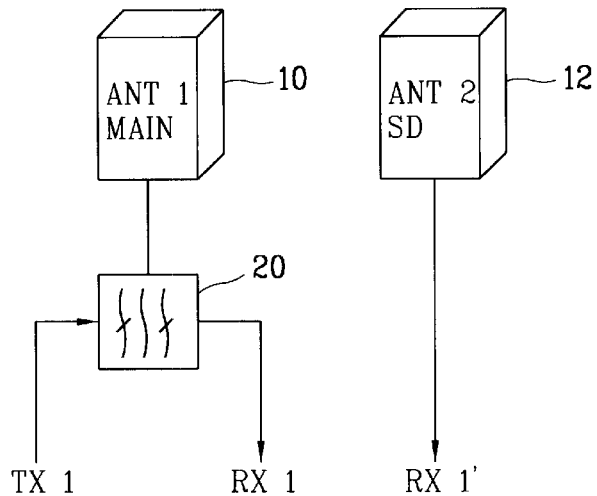
FIG. 1 is a schematic block diagram of an antenna sharing apparatus of a base station using a single frequency band.
Figure 2:
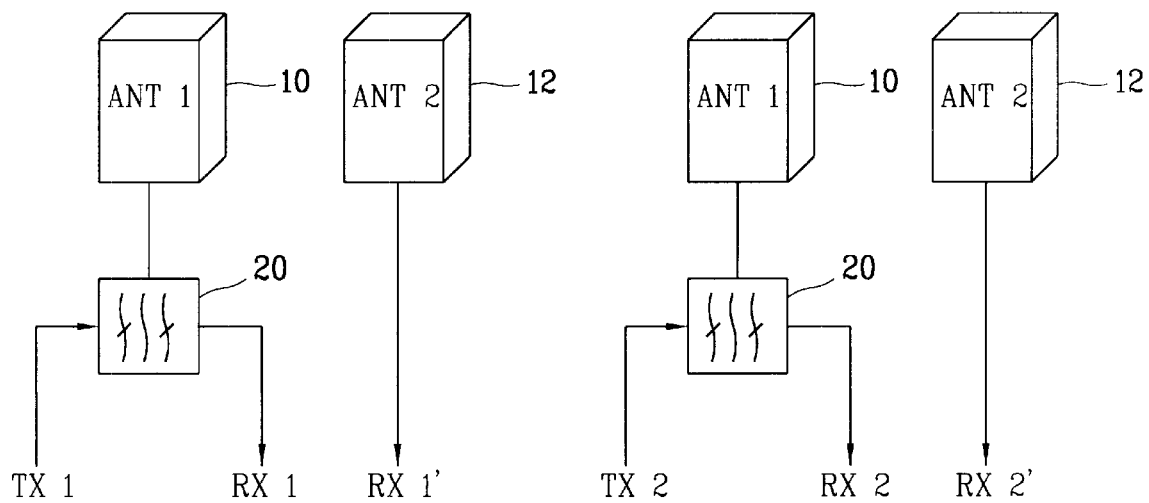
FIG. 2 is a schematic block diagram of an antenna sharing apparatus of a base station using two frequency bands.
Figure 3:
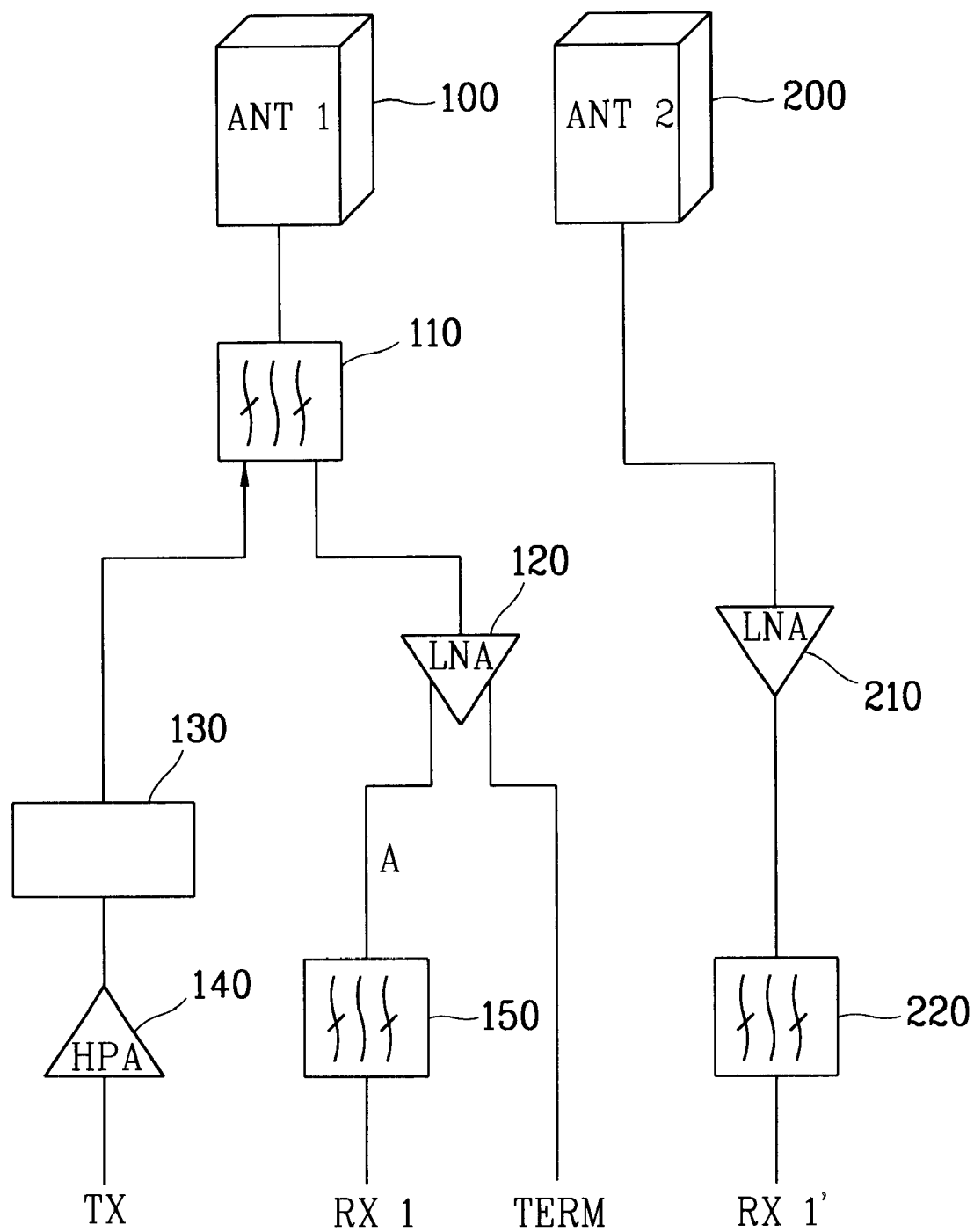
FIG. 3 is a schematic block diagram of an antenna sharing apparatus of a base station using a single frequency band in accordance with a preferred embodiment of the present invention.

FIG. 3 is a schematic block diagram of an antenna sharing apparatus of a base station using a single frequency band in accordance with a preferred embodiment of the present invention.

As shown in FIG. 3, an antenna sharing apparatus of a base station includes a high power amplifier (HPA) 140 amplifying a transmission signal (Tx); a channel filter 130 filtering an output signal of the HPA 140, a duplexer 110 outputting the output signal of the channel filter 130 to an antenna 100 and inputting a reception signal applied from the antenna 100, a low noise amplifier (LNA) 120 amplifying the output signal of the duplexer 110 and outputting it to two paths ('A' and 'B'); a band-pass filter 150 filtering an output signal of the LNA 120 inputted through the path 'A' and outputting a reception signal (Rx1); an LNA 210 for low-noise amplifying the reception signal inputted through the antenna 200; a band-pass filter 220 filtering the output signal of the LNA 210 inputted through the path 'C' and outputting a reception signal (Rx1'). At this time, the path 'B' of the LNA 120 is terminated., and the band-pass filters 150 and 220 have same FA frequency.

The operation of the antenna sharing apparatus of a base station constructed as described above will now be explained with reference to FIG. 3.

The HPA 140 amplifies the transmission signal outputted from the base station and outputs it. The channel filter 130 outputs the transmission signal amplified by the HPA 140 to the duplexer 110.

Then, the duplexer 110 divides the path so as to output the transmission signal which has been filtered by the channel filter 130 to the antenna 100, and output the reception signal to the LNA 120 upon receipt of it from the antenna.

The reception signal (Rx1) received through the antenna is applied to the LNA 120 by the duplexer 110, and the LNA 120 low-noise amplifies the inputted reception signal (Rx1) with a predetermined gain.

At this time, the LNA 120 outputs the same level of reception signals as amplified through two paths (A and B). In this respect, in case of using a single frequency band (1 FA), the path 'B' is terminated. Accordingly, the BPF 150 filters the reception signal received from the LNA 120 through the path 'A' and outputs it to the base station.

The reception signal (Rx1') received through the antenna 200 is low-noise amplified as much as a predetermined gain and inputted through the path 'C' to the BPF 220, and the BPF 220 filters the inputted reception signal (Rx1') and outputs it to the base station. Therefore, the base station synthesizes the reception signals (Rx1 and Rx1') to prevent a fading phenomenon.

Figure 4:
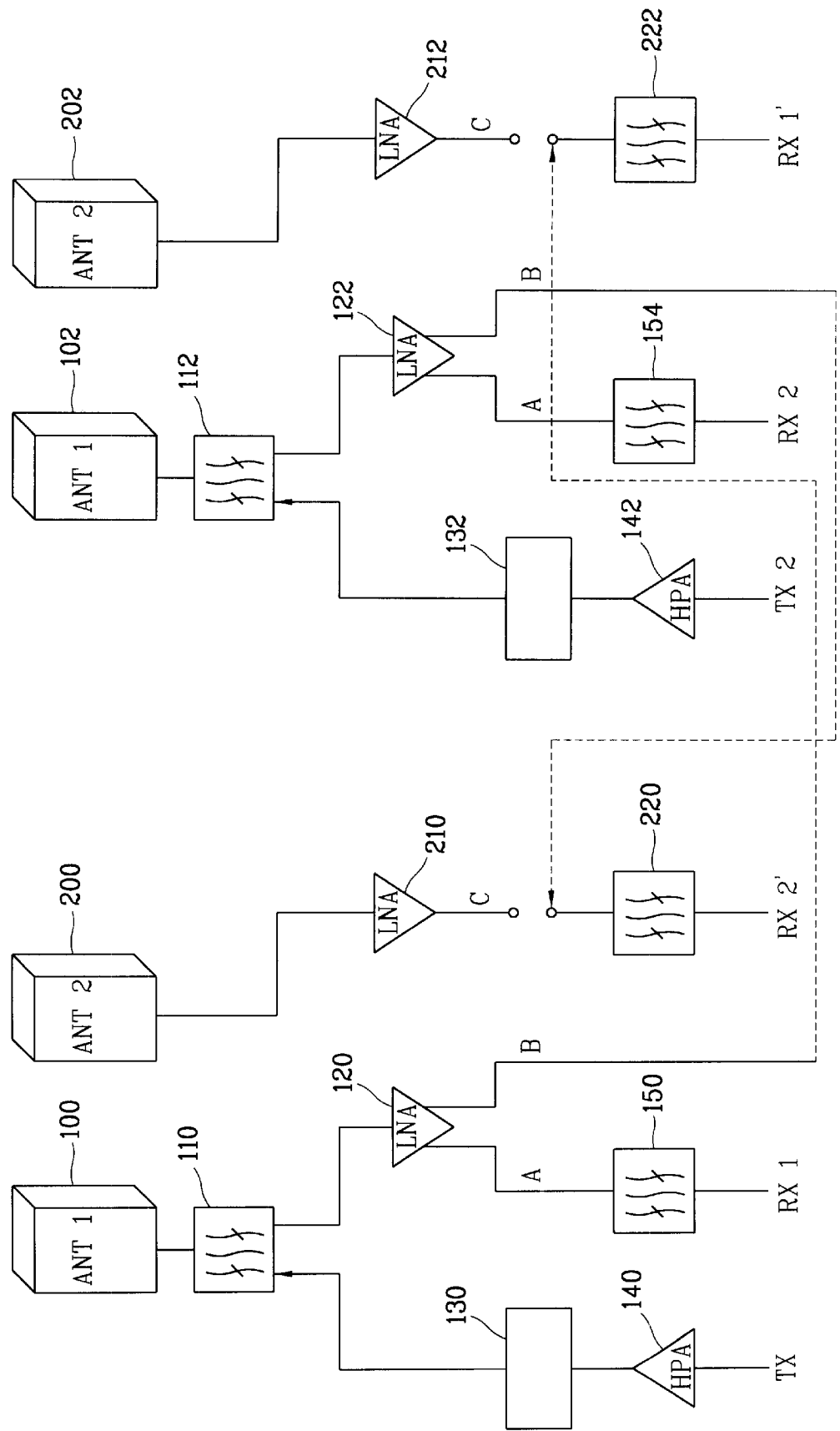
FIG. 4 is a schematic block diagram of an antenna sharing apparatus of a base station using two frequency bands in accordance with the preferred embodiment of the present invention.

FIG. 4 is a schematic block diagram of an antenna sharing apparatus of a base station using two frequency bands in accordance with the preferred embodiment of the present invention.

As shown in FIG. 4, in increasing the 2 FA, an antenna 102, a duplexer 112, a LAN 122, a channel filter 132, a HPA 142 and BPFs 154 and 222 are installed in addition to the antenna sharing apparatus as shown in FIG. 3, and then, the other path 'B' of the LNA 120 is connected to an input terminal of the BPF 222 and the other path 'B' of the LNA 122 is connected to an input terminal of the BPF 220.

Accordingly, in case of increasing 2 FA, since there is no necessity for installing the antennas 200 and 202 and the LNA 210 and 212, the frequency allocation can be easily increased by using only the two antennas 100 and 102.

Figure 5:
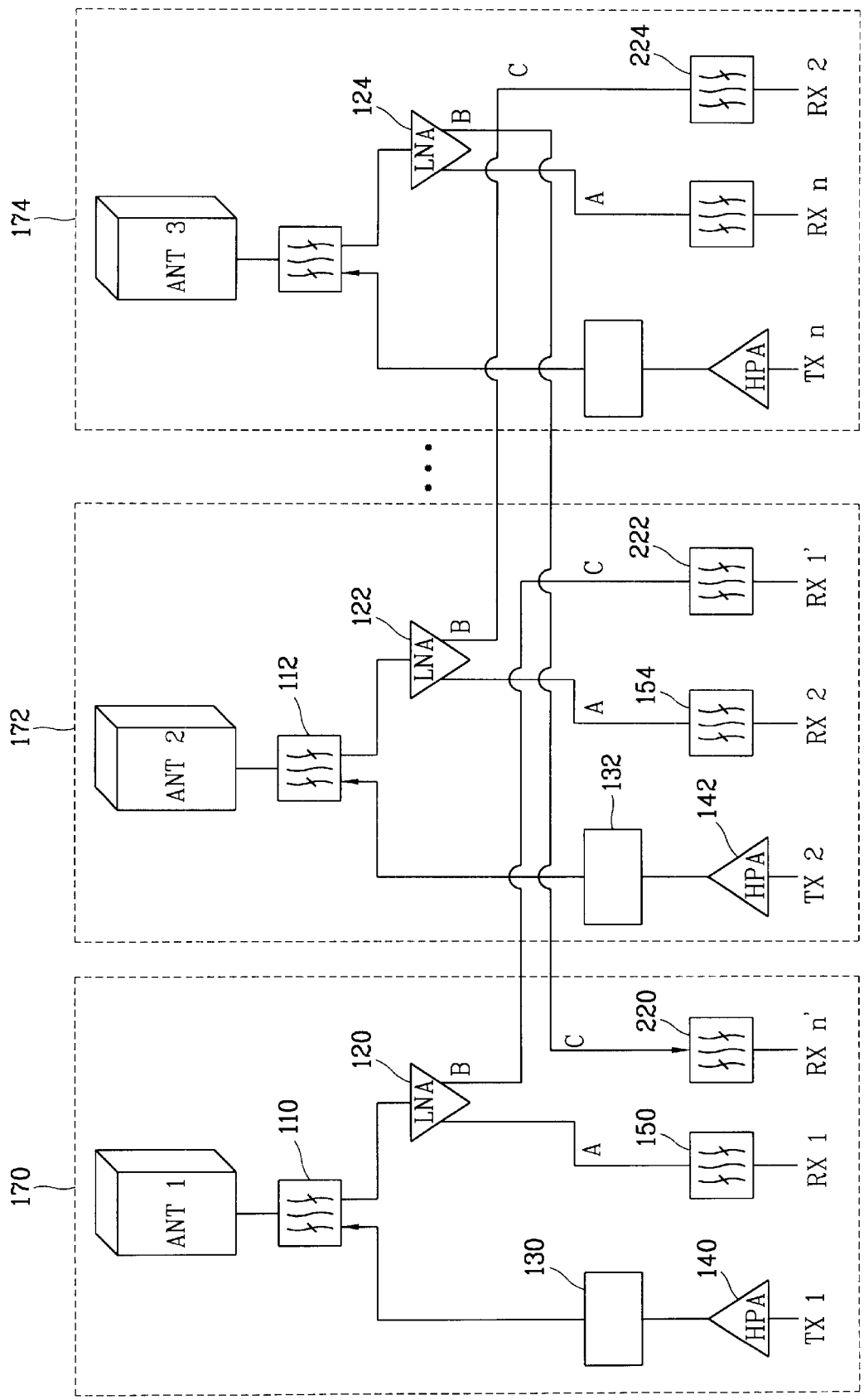
FIG. 5 is a schematic block diagram of an antenna sharing apparatus of a base station using a plurality of frequency bands in accordance with the preferred embodiment of the present invention.

FIG. 5 is a schematic block diagram of an antenna sharing apparatus of a base station using a plurality of frequency bands in accordance with the preferred embodiment of the present invention.

The present invention is not limited to the 2 FA increase.

That is, as shown in FIG. 5, in case of increasing the frequency allocation (FA) by plural ones, the antenna can be additionally installed accordingly in the same manner.

In detail, after installing the plurality of antenna sharing apparatuses having the same structure, the path 'B' of the LNA 120 of the antenna sharing apparatus 170 is connected to an input terminal of the BPF 222 of the antenna sharing apparatus 172, the path 'B' of the LNA 122 of the antenna sharing apparatus 172 is connected to an input terminal of the BPF 224 of the antenna sharing apparatus 174, and the path 'B' of the LNA 124 of the antenna sharing apparatus 174 is connected to an input terminal of the BPF 220 of the antenna sharing apparatus 170.

As so far described, the antenna sharing apparatus of a base station of the present invention has the following advantage. That is, in case of using a plurality of radio frequency band (FA) in the W-CDMA system without guard band, the antenna can be shared by a simple cable connection, so that the number of antenna and components required for additionally installing the antenna can be reduced.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A W-CDMA system having a plurality of antenna sharing apparatuses of a base station, each having an LNA (Low Noise Amplifier) for receiving a first reception signal from a transmission-reception antenna and separately outputting it to first and second paths and further having a band-pass filter filtering a second reception signal;

wherein one antenna sharing apparatus connects a second path of each antenna sharing apparatus to an input terminal of a band-pass filter of a different antenna sharing apparatus if a number of frequency allocation is increased in the system.

2. The system of claim 1, wherein the output signals of the first and the second paths have the same power level.

3. The system of claim 1, wherein the plurality of antenna sharing apparatuses have the same structural configuration.

4. The system of claim 3, wherein each antenna sharing apparatus comprises:

a high power amplifier (HPA) for amplifying a transmission signal;

a channel filter for filtering an output signal of the HPA;

a duplexer for outputting an output signal of the channel filter to a first antenna and inputting the first reception signal outputted from the first antenna;

a first LNA for low-noise amplifying the first reception signal inputted from the duplexer and separately outputting it to the first and the second paths;

a first band-pass filter for filtering the first reception signal inputted through the first path;

a second LNA for amplifying a second reception signal inputted through a second antenna; and a second band-pass filter for filtering an output signal of the second LNA.

5. An antenna sharing apparatus of a base station comprising:

an HPA for amplifying a transmission signal;

a duplexer for outputting an output signal of the channel filter and inputting a reception signal outputted from a first antenna;

a first LNA for amplifying a reception signal inputted from the duplexer and separately outputting it to first and second paths;

a first band-pass filter for filtering the reception signal inputted through the first path;

a second LNA for amplifying the reception signal inputted through the second antenna; and a second band-pass filter for filtering an output signal of the second LNA, wherein the second path is coupled to an input terminal of the second band-pass filter included in a different antenna sharing apparatus if multiple frequency allocations are used.

6. The apparatus of claim 5, wherein the second path is terminated in case that a single frequency band is used.

7. The apparatus of claim 5, wherein the different frequency sharing apparatus has the same structural configuration.

8. The apparatus of claim 7, wherein the different frequency sharing apparatus comprising:

a high power amplifier (HPA) for high-output amplifying a transmission signal;

a channel filter for filtering an output signal of the HPA;

a duplexer for outputting an output signal of the channel filter to a third antenna and inputting a reception signal outputted from the third antenna;

a first LNA for low-noise amplifying the reception signal inputted from the duplexer and separately outputting it to first and second paths;

a third band-pass filter for filtering the reception signal inputted through the first path; and a fourth bans-pass filter for filtering the reception signal inputted from the other sharing apparatus.

9. AW-CDMA communication system having a plurality of antenna sharing apparatuses, each having a low noise amplifier (LNA) that amplifies a first reception signal received from a transmission-reception antenna and separately outputting it to first and second paths and a band-pass filter that filters a second reception signal received from a reception antenna, wherein the second path of one antenna sharing apparatus is coupled to an input terminal of the band-pass filter included in another antenna sharing apparatus to increase the frequency allocation.

10. The system of claim 9, wherein be output signal of the first path is identical to the output signal of the second path.

11. The system of claim 9, wherein the plurality of antenna sharing apparatuses have the same structural configuration.

12. The system of claim 11, wherein each antenna sharing apparatus comprises:

a high power amplifier (HPA) for amplifying a transmission signal;

a channel filter for filtering an output signal of the HPA;

a duplexer for outputting an output signal of the channel filter to the transmission-reception antenna and inputting the first reception signal outputted from the transmission-reception antenna;

a first LNA for low-noise amplifying the first reception signal inputted from the duplexer and separately outputting it to the first and second paths;

a first band-pass filter for filtering the first reception signal inputted through the first path;

a second LNA for amplifying a second reception signal inputted through the reception antenna; and a second band-pass filter for filtering an output signal of the second LNA.

13. The system of claim 4, wherein the first antenna is the transmission-reception antenna, and were the second antenna is the reception antenna.

* * * * *